2,973,263

ANTISTATIC BACKING LAYERS FOR PHOTOGRAPHIC FILM

Frank J. Kaszuba, June M. Matteson, and Russell P. Easton, Binghamton, N.Y., assignors to General Aniline & Film Corporation, New York, N.Y., a corporation of Delaware No Drawing. Filed Apr. 19, 1957, Ser. No. 653,755

4 Claims. (Cl. 96—87)

This invention relates to photographic film and particularly to a photographic film having antistatic properties.

It is well established that photographic films have a strong tendency to acquire and accumulate static electricity. Such static electrification can occur during the manufacture of the film base; during subsequent emulsion coating, trimming and packaging operations; or by operation in cameras, particularly in motion picture cameras and cameras used for X-ray fluorography where a series of pictures is taken in rapid succession. The sudden discharge of these static charges, after a light-sensitive emulsion coating has been applied to the film base, causes typical "static" markings in the photographic emulsion and these become visible upon development.

Static marks are especially troublesome in films which must be manufactured without an antihalation backing layer and are, therefore, deprived of the antistatic protection normally provided by such layers during the manufacturing operation. Considerable static electricity is generated and eventually given off in the form of spark discharges when such a film without an antihalation layer or other antistatic protection is wound into a tight roll and subsequently unwound; for instance, during coating or while being unwound in a camera magazine. The results of these spark discharges show up in the developed film as black spots, streaks, lines, irregular fogged patterns, or combinations thereof.

Of the various supports currently utilized for the production of photographic film, those prepared from cellulose organic esters particularly cellulose acetate, cellulose propionate, cellulose butyrate, and mixed cellulose esters have the greatest tendency to acquire rather high electrical charges. When the film is passed over another film surface or over highly polished metal surfaces, this tendency becomes especially pronounced. Antistatic protection of cellulose ester film supports is especially difficult to achieve under conditions of low humidity. The coating operation has therefore been carried out at relatively high humidity levels with adverse influence upon the photographic characteristics of the emulsion. Even this precaution is no cure-all because the taking of the picture and the processing of the film is often carried out in dry climates with exceptionally low humidity conditions.

It has been attempted to overcome the generation of static in films by incorporating electrolytes or hygroscopic substances into the subbing compositions for the emulsion side with the intent to impart conductivity to the film and to dissipate the static electricity before discharge and spot exposure of the emulsion. Unfortunately, most of these additives are incompatible with the subbing compositions which contain cellulose derivatives and gelatin dispersed in organic solvents and thus introduce manufacturing difficulties.

It has also been proposed to overcome the static caused in films without antihalation layers by the use of a special thin antistatic backing layer or "back-wash" which confers upon the treated film some measure of antistatic protection but introduces at the same time new complications. Typically, these antistatic layers use polymers and copolymers derived from unsaturated carboxylic acids as described in United States Patent 2,074,647. These layers which have to be applied before the emulsion coating are usually quite tacky to the extent that they are subject to offset, blocking and poor slippage. Consequently, the unwinding of the film base which precedes the emulsion coating operation requires considerable force with the result that the separation of the rolled-up film causes formation of new centers of static electricity. Besides, the tackiness of the antistatic backing layer leads to a certain friction between the backing layer and the rollers of the coating machine, thus reducing the slippage properties and increasing the coefficient of friction, again contributing to the formation and discharge of static electricity.

The principal object of the present invention is to provide photographic film supports which will possess improved slippage and antistatic properties.

We have discovered that film supports, especially photographic motion picture film prepared from cellulose derivatives such as cellulose acetate, cellulose propionate, cellulose butyrate, cellulose acetate propionate, cellulose acetate butyrate, and the like can be protected against static susceptibility by coating or swabbing a cellulosic film support itself or the cellulosic side of a finished photographic film with a solution having a pH of 7.5 to 9 and containing a wax or wax-like material in a finely divided or dispersed form and an alkali metal salt of a triple polymer obtained from one molar equivalent of a vinyl ester, e.g., vinyl chloride, vinyl propionate, vinyl butyrate, vinyl acetate, methyl acrylate, ethyl acrylate, butyl acrylate, methyl methacrylate or ethyl methacrylate; one molar equivalent of styrene; and two molar equivalents of acrylic acid.

The use of the triple polymer gives better antistatic protection than hitherto obtainable with other polymers or copolymers. The presence of the wax or wax-like material which is uniformly dispersed in the backing layer reduces the slippage (as expressed by the inverse coefficient of friction). Quite unexpectedly the wax accomplishes also a synergistic reduction in susceptibility to static electrification and the development of electrostatic charges. This reduction in static susceptibility and the improved slippage properties became especially apparent when the films were exposed in motion picture cameras particularly those using camera magazines. By necessity, the film is wound very tightly in magazines and the separation of the emulsion side from the backing requires considerable force, giving rise to the formation of static electricity of the friction and separation type. The combined use of the triple polymer and the wax improves the slippage and reduces the static susceptibility even further.

In practicing the present invention, the triple polymer is dissolved in a suitable solvent, preferably a mixture of water and a low boiling alcohol such as methanol, ethanol, propanol or isopropanol and sufficient alkali metal hydroxide is added to raise the pH to the desired level. The wax dispersion which is preferably of an aqueous nature is then added. The amount of resin to be employed may range from 2 to 20 grams per liter of solvent mixture. The amount of wax employed ranges from 0.1 to 2 grams per liter of solvent mixture. Based on the amount of resin used, the amount of wax varies from 1 to 10 percent by weight.

Solutions which we have found particularly suitable for the preparation of any antistatic layers can be compounded in the following proportions, it being understood that the total volume of the resulting solution is to be one liter.

| | | Parts |
|---|---|---|
| Triple polymer | gms | 2 to 20 |
| Volatile alcohol | mls | 400 to 800 |
| Water | mls | 200 to 600 |
| Wax | gms | 0.1 to 2 |
| Alkali metal hydroxide | gms | 1.0 to 5 |

The desired alkalinity of the resultant solution is established by the addition of an alkali metal hydroxide solution to a pH ranging from 7.0 to 9 with a preferred range of from 8 to 8.5.

One liter of solution is usually adequate to coat 400 square feet of film base. The thickness of the dried antistatic backing layer ranges from 0.2 to 1 micron, depending on the solids content of the solution and to a lesser extent on the coating speed. The amount of total solid deposited on the film base varies from 2 to 40 milligrams per square foot.

A typical triple polymer derived by the copolymerization of vinyl acetate, styrene and acrylic acid is prepared as follows: A mixture of 420 grams (1 molar equivalent) of distilled vinyl acetate, 702.8 grams (2 molar equivalents) of distilled acrylic acid, and 504 grams (1 molar equivalent) of distilled styrene is copolymerized in ethanol solution in the presence of benzoyl peroxide for about 14–16 hours until the viscosity of the reaction mixture reaches a maximum comparable to that of glycerine. The mixture is cooled and poured into a solution of 590 grams of sodium hydroxide in 8 liters of water. Twenty-eight liters of water are added over a period of 25 minutes and the copolymer is precipitated by the addition of 6 N hydrochloric acid until a pH of 2 is reached. Upon acidification, the polymer forms a milky colloid which is effectively flocculated by passing steam through the collodial dispersion until a temperature of 58° C. is reached. The reaction mixture is then cooled to 35° C. by the addition of ice. The cooled polymer is filtered, washed, dried in air for one day, and then dried in the oven until the odor of styrene has disappeared.

Suitable waxes which can be combined with the triple polymer include beeswax, carnauba wax, cerosin wax, chinese wax, flax wax, godang wax, Java wax, insect wax, paraffin wax, montan wax and ceresin wax, spermaceti wax, and the like. Among the chemically identified compounds present in these waxes are esters derived from long-chain monohydric alcohols and long-chain acids, high molecular weight hydrocarbons, fatty acids, alcohols and ketones.

The aforesaid waxes may be amorphous or microcrystalline and can be used alone or in the form of mixtures. The waxes which have a melting point higher than 43° C. may be dispersed in the coating solution by conventional means but preferably by the use of a suitable surface active agent of the cationic, anionic or nonionic type. A great number of these agents have been described in the literature and the following which we have found suitable are illustrative:

The reaction products of long-chained aliphatic amines such as dodecylamine and octadecylamine with ethylene oxide;

The esters of long-chained fatty acids with tertiary amine alcohols, i.e., stearyl triethanolamine and oleyl triethanolamine;

The reaction products of ethylene oxide and propylene oxide with a phenol or an alcohol, e.g. the reaction products of from 8 to 20 moles of ethylene oxide with dodecylphenol or oleyl alcohol;

The esters of long-chained fatty acids such as stearic or lauric and anhydrosorbitol as well as their reaction products with ethylene oxide;

Glycol esters such as those obtained by reacting oleic acid with at least 6 molar equivalents of ethylene oxide;

Long-chained fatty acid esters of pentaerythritol and dipentaerythritol, i.e., such esters of stearic and lauric acid;

Ethers obtained by the etherification of long-chained alcohols and glycols, e.g., the reaction products of oleyl alcohol and di- or tri-ethylene glycol, glycerol or polyglycerol;

The reaction products of fatty acid ethanol amides and formaldehyde;

Ammonium or alkali metal sulfonates of carboxylic acid amides, e.g., sodium cetyl propionamide-$\beta$-sulfonate or sodium naphthenylacetamide trisulfonate;

Sodium lauryl sulfate, sodium dioctyl sulfosuccinate;

Water soluble polymeric carboxylic acids, e.g., the polymers or mixed polymers of acrylic, methacrylic and maleic acid;

The mono-, di-, tri-ethanolamine, diethylamine, triethylamine or morpholine salts of long-chained fatty acids such as palmitic, stearic or oleic acid.

In lieu of using a separate dispersing agent, it is possible where the wax contains a sufficient amount of a long-chained fatty acid to effect dispersion by the addition of a base such as an alkylolamine (diethanolamine or tri-ethanolamine), morpholine, diethylamine and the like. In this case, as illustrated by beeswax which contains upwards of ten percent of cerotic acid, the base reacts with the acid and forms a dispersing agent in situ.

It is advisable to use dispersions in which the wax particles have a size ranging from 0.1 to 5 microns. Waxes meeting this requirement are available on the open market. The particle size of any wax dispersion selected for use, moreover, can be readily ascertained by observation under the microscope.

Before proceeding with the practical aspects of the present invention, it will be helpful to describe briefly the testing equipment employed in evaluating the static susceptibility of a treated film.

The relative static susceptibility can be determined by conductivity and resistivity measurements or by the use of the static generating and measuring device described in United States Patent 2,584,337. For a practical test which shows the actual static marks photographically, the film sample which is provided with a highly sensitive silver halide emulsion layer is submitted to the action of a highly effective static generator. For instance, the sample is placed on an insulated polystyrene plate and rubbed back and forth a predetermined number of times (usually 20 times) with a Nylon covered sponge rubber cushion. Development of the film with a suitable developer solution shows up the static marks and permits a practical evaluation of static susceptibility with the relative grades of static assigned as follows: none; light; very light; medium; heavy; very heavy.

Surface resistivity as defined inter alia in United States Patent 2,649,374 is used as an indication of the electrical resistance of the backing side of a film sample. It is determined by measuring the resistance in megohms between two electrodes. These values are influenced by the width and the spacing between the electrodes but this influence can be disregarded because the electrodes and their distance from each other are not changed during the comparison tests.

Slippage, which is the inverse function of the coefficient of friction, is measured by an automatic device measuring the angle at which a metal block slides down an inclined plane which is covered with the material to be tested. This device raises the angle of the plane slowly and the motion is stopped once the block has slid down and hit a contact point which stops the raising motion thus permitting the reading of the angle.

The following examples describe the manner in which the treatment of a film support of a cellulose derivative is effected. These examples are included for purposes of illustration only and are not intended to be construed as limiting the scope of the invention.

Example I

A strip of cellulose acetate butyrate film support containing 18.5 percent acetyl and 35 percent butyryl was coated with the following composition:

| | Parts |
|---|---|
| Triple polymer of styrene, vinyl acetate and acrylic acid _____gms__ | 10 |
| Beeswax (5 percent dispersion) _____mls__ | 5 |
| Methanol _____mls__ | 600 |
| Water _____mls__ | 395 |
| Potassium hydroxide _____gms__ | 2.0 |

The beeswax dispersion was prepared by adding with high speed mechanical stirring 50 grams of melted beeswax having a temperature of 70° C. to a solution of 5 grams of triethanolamine in 1 liter of water which had the same temperature. Stirring was continued until the dispersion had been cooled to room temperature. The triple polymer was dispersed in the methanol water mixture, the beeswax emulsion added, and the pH of the final solution was then adjusted with potassium hydroxide to 8.0.

After the antistatic layer had dried, a high-speed aerial type gelatin silver halide emulsion was applied to its opposite side and dried. The coated film strip was tested and compared for static susceptibility with a strip of cellulose acetate butyrate which was coated with the same emulsion but had no backing layer. Both samples were submitted to the action of the previously described static generator and then developed in a black and white developer. The untreated sample strip showed very heavy static marks whereas the film provided with the antistatic backing layer showed no noticeable static marks.

A comparison film which was prepared in the identical manner except that the beeswax had been omitted from the coating solution for the antistatic layer was less satisfactory because it was tacky and had poor slippage properties. The photographic results were likewise inferior because the film which had been subjected to the static generating treatment showed some improvement over the untreated film but still displayed after development clearly visible static marks.

Example II

A strip of cellulose acetate film support containing 61.5 percent combined acetic acid was coated with a solution having the following composition:

| | Parts |
|---|---|
| Triple polymer of styrene, vinyl acetate and acrylic acid _____gms__ | 12 |
| Beeswax (5 percent dispersion) _____mls__ | 20 |
| Methanol _____mls__ | 560 |
| Water _____mls__ | 420 |
| Potassium hydroxide _____gms__ | 2.0 |

The solution was prepared as described in Example I, and the pH adjusted to a level of 8.5.

This film was compared with two other films, one from which the beeswax acid had been omitted and one which was provided with an antistatic layer containing calcium silicate and the reaction product of formaldehyde and salicylic acid as described in United States Patent 2,584,337. Static susceptibility measurements as expressed by surface resistivity at 40% relative humidity made by using two electrodes of 10 cm. lengths and spaced 0.2 cm. apart gave the following readings:

| | Megohms |
|---|---|
| Film having conventional antistatic layer _____ | $5 \times 10^7$ |
| Film having antistatic layer and containing triple polymer _____ | $4 \times 10^5$ |
| Film containing triple polymer and beeswax ___ | $6 \times 10^2$ |

The relative slippage of the three samples was measured with the sliding block method described above and the following results were obtained. The values are expressed as the tangent of the angle at which the sliding block moves over the surface of the film:

| | |
|---|---|
| Comparison film _____ | Tangent=0.44 |
| Film having an antistatic layer containing tripole polymer _____ | Tangent=0.49 |
| Film having an antistatic layer containing triple polymer and beeswax _____ | Tangent=0.27 |

It will be observed from these results that the film containing both the beeswax and the triple polymer shows better slippage characteristics and less static susceptibility than the two comparison samples.

Example III

An aqueous wax composition was prepared by dispersing a melt of 30 parts of bleached carnauba wax, 12 parts of white beeswax and 28 parts of paraffin wax in a solution containing 10 parts of polyoxyalkylene sorbitan monolaurate and 5 parts of morpholine in 200 parts of water at a temperature of 80° C. The resulting dispersion was used in the preparation of the following coating solution:

| | Parts |
|---|---|
| Triple polymer of styrene, vinyl acetate and acrylic acid _____gms__ | 15 |
| Wax (7 percent dispersion) _____mls__ | 20 |
| Methanol _____mls__ | 600 |
| Water _____mls__ | 380 |
| Aqueous sodium hydroxide (sufficient to raise the pH to 8.5). | |

The resultant solution was coated onto a strip of cellulose acetate film base, containing 61.5 percent combined acetic acid, and dried. The so-treated strip was then coated on the opposite side with a high speed gelatinous silver halide emulsion of the type used in aerial motion picture cameras. The film sample was allowed to run through motion picture cameras in absolute darkness and was then developed in an ordinary black and white developer, fixed and washed. No static mark could be found. A comparison film which had untreated cellulose acetate film as a support showed very heavy static marks, whereas the static marks on a film having a conventional backing layer could be classified as medium. Samples coated on a film base backed with the triple polymer alone displayed moderately light static marks.

The protective nature of the coating containing the salt of the triple polymer together with the beeswax becomes most pronounced when tested at low humidities in comparison with the samples containing the triple polymer alone.

The treated photographic film bases produced according to the present invention in addition to preventing the accumulation of static charges when unwound during a coating operation were found to be very satisfactory from the standpoint of physical requirements such as high strength, flexibility, slippage and good water resistance.

The invention is not limited to the treatment of uncoated photographic film base utilized in the manufacture of such film, but is also useful in treating the back surface of processed photographic roll or sheet film having a cellulose ester base. For instance, it can be used in the treatment of finished motion picture negative film so as to protect the exposed and processed film against the accumulation of dust and dirt particles which occur when the film is moved through a printer or projector.

It will be understood that wherein the claims appended hereto the term "film" is used, that such term is intended to include film supports and finished films carrying emulsion layers.

It is not intended that the invention be limited by any of the specific examples which have been given merely for the sake of illustration nor by any theory as to the mechanism of the treating operation since variations of the invention will become apparent to workers in the art. Our invention is limited only by the following claims.

We claim:
1. A light sensitive photographic element comprising a cellulose ester film support carrying a silver halide emulsion layer, said element having an antistatic backing layer comprising a wax having a melting point higher than 43° C. and a particle size ranging from 0.1 to 5 microns uniformly dispersed in an alkali metal salt of a terpolymer obtained by the copolymerization of one molar equivalent of a lower aliphatic vinyl ester selected from the group consisting of vinyl acetate, vinyl propionate and vinyl butyrate, two molar equivalents of acrylic acid and one molar equivalent of styrene, the amount of wax based on the amount of triple polymer being on the order of from 1 to 10 percent by weight.

2. A light sensitive photographic element comprising a cellulose ester film support carrying a silver halide emulsion layer, said element having an antistatic backing layer comprising an alkali metal salt of a terpolymer obtained by the copolymerization of one molar equivalent of vinyl acetate, two molar equivalents of acrylic acid and one molar equivalent of styrene and beeswax having a particle size ranging from 0.1 to 5.0 microns uniformly dispersed in said layer, the amount of beeswax based on the amount of triple polymer being on the order of from 1 to 10 percent by weight.

3. An antistatic composition suitable for treating a film of a cellulose ester which comprises uniformly dispersed in a mixture of from 200 to 600 parts by volume of water and from 400 to 800 parts by volume of a volatile alcohol having no more than 3 carbon atoms, from 0.1 to 2 parts by weight of a wax, having a melting point higher than 43° C. and a particle size ranging from 0.1 to 5.0 microns, from 2 to 20 parts by weight of a terpolymer resulting from the copolymerization of one molar equivalent of a lower aliphatic vinyl ester selected from the group consisting of vinyl acetate, vinyl propionate and vinyl butyrate, two molar equivalents of acrylic acid and one molar equivalent of styrene, a dispersing agent for said wax, and an amount of an alkali metal hydroxide sufficient to establish the pH of said solution at a value ranging from 7.0 to 9.

4. An antistatic composition suitable for treating a cellulose ester film base which comprises uniformly dispersed in a solution of from 200 to 600 parts by volume of water and from 400 to 800 parts by volume of methanol, from 0.1 to 2 parts by weight of beeswax having a particle size ranging from 0.1 to 5.0 microns, from 2 to 20 parts by weight of a terpolymer obtained by the copolymerization of one molar equivalent of vinyl acetate, two molar equivalents of acrylic acid and one molar equivalent of styrene, a surface active agent, and sufficient potassium hydroxide to establish a pH between 8.0 and 8.5.

References Cited in the file of this patent
UNITED STATES PATENTS

| | | |
|---|---|---|
| 2,074,647 | Hagedorn et al. | Mar. 23, 1937 |
| 2,606,165 | Chapin et al. | Aug. 5, 1952 |
| 2,695,277 | Pabst et al. | Nov. 23, 1954 |

OTHER REFERENCES

Camera, September 1956, vol. 35, #9, page 432.